(12) United States Patent
Heger et al.

(10) Patent No.: US 12,717,358 B2
(45) Date of Patent: Aug. 25, 2026

(54) METHOD FOR AVOIDING CRITICAL OPERATING CONDITIONS OF A LIQUID TANK DEVICE AND LIQUID TANK DEVICE

(71) Applicant: BRITA SE, Taunusstein (DE)

(72) Inventors: Johann Heger, Frankfurt am Main (DE); Oliver Machui, Bad Homburg (DE); Michael Bubinger, Wiesbaden (DE)

(73) Assignee: BRITA SE, Taunusstein (DE)

( * ) Notice: Subject to any disclaimer, the term of this patent is extended or adjusted under 35 U.S.C. 154(b) by 123 days.

(21) Appl. No.: 18/549,790

(22) PCT Filed: Mar. 8, 2022

(86) PCT No.: PCT/EP2022/055828

§ 371 (c)(1),
(2) Date: Sep. 8, 2023

(87) PCT Pub. No.: WO2022/189401

PCT Pub. Date: Sep. 15, 2022

(65) Prior Publication Data

US 2024/0152163 A1 May 9, 2024

(30) Foreign Application Priority Data

Mar. 11, 2021 (EP) .................................... 21161997

(51) Int. Cl.
*G05D 9/12* (2006.01)
*F24H 1/08* (2022.01)
(Continued)

(52) U.S. Cl.
CPC ............... *G05D 9/12* (2013.01); *F24H 1/201* (2013.01); *F24H 15/395* (2022.01);
(Continued)

(58) Field of Classification Search
CPC ........... Y10T 137/0753; Y10T 137/077; Y10T 137/0801; Y10T 137/0826; Y10T 137/085;
(Continued)

(56) References Cited

U.S. PATENT DOCUMENTS 3,972,340 A * 8/1976 Miller ................ F02M 37/0023 180/282
4,353,847 A * 10/1982 Sato ....................... F02M 17/34 261/DIG. 50
(Continued)

FOREIGN PATENT DOCUMENTS

CN 102715836 A 10/2012
CN 108167659 A 6/2018
(Continued)

OTHER PUBLICATIONS

Translation of EP 1919020 2008.*
Chinese Office Action dated Mar. 21, 2026 for corresponding Chinese Application CN202280019524.8.

*Primary Examiner* — William M McCalister
(74) *Attorney, Agent, or Firm* — Hudak, Shunk & Farine Co. LPA

(57) ABSTRACT

A liquid tank device comprises a tank housing for storing a liquid within a tank volume inside of the tank housing, whereby the tank housing comprises at least one conduit opening that can be connected in a liquid-tight manner to at least one conduit for the liquid such that the liquid can be supplied to or removed from the tank volume within the tank housing through the conduit opening. A method for warning of and avoiding critical operating conditions of a liquid tank device comprises the detection of a tilting of the tank housing by means of a tilt detection device. The tank volume is shut off from the at least one conduit by means of a closing device if a tilt information from the tilt detection device
(Continued)

exceeds a preset tilt value, resulting in avoiding further flow of liquid into or from the tank volume through the at least one conduit after detecting the tilting of the tank housing.

14 Claims, 3 Drawing Sheets

(51) Int. Cl.
*F24H 1/20* (2022.01)
*F24H 9/17* (2022.01)
*F24H 9/20* (2022.01)
*F24H 15/395* (2022.01)
*G05D 7/06* (2006.01)

(52) U.S. Cl.
CPC ............. *G05D 7/0635* (2013.01); *F24H 1/08* (2013.01); *F24H 9/17* (2022.01); *F24H 9/2021* (2013.01)

(58) Field of Classification Search
CPC ......... Y10T 137/0874; Y10T 137/0898; Y10T 137/0926; Y10T 137/0947; Y10T 137/7287–7501; F24H 1/201; F24H 15/395; F24H 1/08; F24H 9/17; F24H 9/2021; G05D 9/12; G05D 7/0635
USPC ...................................... 137/38–46, 386–454
See application file for complete search history.

(56) References Cited

U.S. PATENT DOCUMENTS

| | | | | |
|---|---|---|---|---|
| 4,815,096 | A * | 3/1989 | Burwell | F27D 9/00 373/74 |
| 9,151,605 | B1 * | 10/2015 | Sweeney | A47G 23/16 |
| 2004/0062960 | A1 * | 4/2004 | Sakaue | H01M 8/04761 429/479 |
| 2004/0128749 | A1 * | 7/2004 | Scott | A47K 11/12 4/144.1 |
| 2005/0083636 | A1 * | 4/2005 | Kim | B60K 15/077 361/329 |
| 2011/0129755 | A1 * | 6/2011 | Nagasaki | H01M 8/04029 429/447 |
| 2013/0300786 | A1 * | 11/2013 | Muyskens | B41J 2/175 347/7 |
| 2014/0017663 | A1 * | 1/2014 | Steinman | A01N 1/143 435/284.1 |
| 2015/0093101 | A1 * | 4/2015 | Lee | F24H 1/102 392/488 |
| 2018/0154767 | A1 * | 6/2018 | Ogiwara | B60K 15/04 |

FOREIGN PATENT DOCUMENTS

| | | | | |
|---|---|---|---|---|
| CN | 110141122 | A | 8/2019 | |
| CN | 111156710 | A | 5/2020 | |
| CN | 212282885 | U | 1/2021 | |
| DE | 11 40 038 | B | 11/1962 | |
| EP | 1919020 | A1 * | 5/2008 | C01B 3/34 |
| GB | 2190826 | A | 12/1987 | |
| KR | 2015 0144093 | A | 12/2015 | |
| KR | 2020 0135146 | A | 12/2020 | |
| WO | 2010002116 | A2 | 1/2010 | |

* cited by examiner

18

8

15

12

13, 16

METHOD FOR AVOIDING CRITICAL OPERATING CONDITIONS OF A LIQUID TANK DEVICE AND LIQUID TANK DEVICE

TECHNICAL FIELD

The invention relates to a method for avoiding critical operating conditions of a liquid tank device, whereby the liquid tank device comprises a tank housing for storing a liquid within a tank volume inside of the tank housing, whereby the tank housing comprises at least one conduit opening that can be connected in a liquid-tight manner to at least one conduit for the liquid such that the liquid can be supplied to or removed from the tank volume within the tank housing through the conduit opening.

BACKGROUND OF THE INVENTION

A liquid tank device with a tank housing that is designed to store an amount of a liquid, e.g. water or a chemical liquid can be used for many different applications. Such liquid tank devices can be used to store an amount of water within a tank volume inside of the tank housing, whereby the stored water can be dispensed for e.g. drinking or washing or even for flushing a water closet. Some liquid tank devices are designed to be transportable and can be used to transport an amount of liquid to a destination. Some other liquid tank devices are intended for stationary use and can be e.g. mounted at a wall or placed on a floor.

It is also known to use such liquid tank devices for heating a liquid like e.g. water that is stored within the tank volume inside the tank housing. Usually, a heating element is arranged inside the tank housing that can be used to heat the liquid that has been filled into the tank volume. Such devices can also be called boilers and can be mounted inside a cupboard or above a sink to provide either hot or cold water from an outlet which can be a water tap or a conduit that is connected to the liquid tank device. Other boilers are designed as freestanding devices that can be placed on a floor or inside a cabinet.

For many applications with stationary use of such a liquid tank device it is advantageous to provide for a permanent connection of the liquid tank device with a reservoir of the liquid, which facilitates the filling or refilling of liquid into the tank volume after an amount of liquid has been dispensed from the liquid tank device via an outlet. In order to enable such a permanent connection, the tank housing usually comprises at least one conduit opening that can be connected in a liquid-tight manner to at least one conduit for the liquid such that the liquid can be supplied to the tank volume within the tank housing. The conduit can be connected to a central water supply in a household or in a building. Thus, refilling the liquid tank device can be controlled by a valve or in an automated manner that does not require any interaction with a user. Many boilers that are used for providing hot water in a kitchen or bathroom are permanently connected via such a permanently attached conduit to the central water supply.

Usually, such liquid tank devices that are intended for stationary use and that are permanently connected to a water supply are placed or mounted at the intended place of use.

During normal use, they are not displaced or tilted. However, in case of an accidental contact e.g. with a child, with an animal like a cat or a dog, with a playing device like e.g. a ball or with automated devices like a vacuum robot, the liquid tank device can be tilted and even fall over. If the tank volume inside the tank housing is not completely closed, liquid may leak from the liquid tank device during tilting or after falling over. Furthermore, if the tank housing is permanently connected to a reservoir of liquid like e.g. a water supply of a household, additional liquid can flow through such an inlet conduit into the tank volume and then leak into the environment. Thus, even though the tank volume of a boiler is usually limited to 5 or 10 liters, a very large amount of water can leak from a boiler that has tipped or fallen over. In case that it is not quickly noticed that the boiler has tipped or fallen over, a large volume of leaking water can cause significant damage to an apartment or to a building.

It is possible to place the boiler inside an outlet tray to avoid immediate leakage of liquid from a tilted or fallen over boiler. However, if the tank volume is continually refilled via a permanent connection to a water supply, even a large outlet tray will be filled with leaking water that then overflows and spills into the environment.

Accordingly, there is a need for a method for avoiding critical operating conditions of such a liquid tank device that provides for additional safety measures in case that the tank housing tilts or falls over.

SUMMARY OF THE INVENTION

The present invention relates to such a method for avoiding critical operation conditions as described at the beginning, whereby a tilting of the tank housing is detected by means of a tilt detection device, and whereby the tank volume is shut off from the at least one conduit by means of a valve device if a tilt information from the tilt detection device exceeds a preset tilt value, resulting in avoiding further flow of liquid into or from the tank volume through the at least one conduit after detecting the tilting of the tank housing. Thus, in case of accidental tilting or falling over of the tank housing during use, a critical condition will be detected by the tilt detection device. As soon as the tilt detection device detects that a tilting of the tank housing exceeds the preset tilt value, the connection to an external liquid supply will be closed to prevent any further liquid to flow into the tilted tank housing and to possibly leak from the tilted tank housing of the liquid tank device. By closing off a conduit that provides a connection to a liquid reservoir, any potential damage due to leakage of liquid from the tilted tank housing is limited to the amount of liquid that is currently stored within the tank volume inside the tank housing. Even if there are additional openings in the tank housing or in case that an accidental falling over of the tank housing causes additional fractures of the tank housing that allow for leakage of the liquid content inside the tank housing, the maximum amount of leakage is limited to the current liquid content of the liquid tank device, which will significantly limit any potential damage to the environment.

The connection to the external liquid supply can be closed e.g. by actuating a valve device that closes the conduit. It is also possible to move a closure over the conduit opening in order to close the conduit opening in a liquid-tight manner. Such a closure can be a lid or a shutter that is relocated along a straight line or pivoted into a closing position that closes the conduit opening. The valve or the closure can be actuated by a mechanical actuation device like e.g. a loaded spring or an electromagnetic actuation device that actuates the valve of the closure as soon as an electric power supply is disconnected from the mechanical actuation device. It is also possible to actuate the valve or the closure by an electrically operated actor, i.e. an electric motor.

According to an advantageous aspect of the invention, the tank housing comprises at least one opening that is not connected with a conduit, whereby the at least one opening of the tank housing is closed if the tilt information from the tilt detection device exceeds the preset tilt value. By also closing any additional openings of the tank housing, any risk of leakage of liquid from the tank housing is further reduced. It is possible to provide for separate valves or closing devices for each of the openings, either conduit openings or other openings like e.g. relief valves or outlets. It is also possible to arrange all openings close to each other and to provide for only one or two closing devices that will close all openings in case that a dangerous tilt of the tank housing is detected.

In order to provide for a reliable detection of a possibly dangerous tilt of the tank housing even in case that there is a malfunction of a control unit or electrical power supply to the liquid tank device, the tilt detection device comprises a mechanical leveling element and that a displacement of the mechanical leveling element is detected that is caused by the tilting. Such a mechanical leveling element can comprise a ball that can be displaced along one axis or on a two-dimensional surface. Any displacement of the ball that exceeds a preset distance will cause the tilt detection device to provide a tilt information that can be used to indicate the potentially critical operation condition and to initiate steps to reduce any danger that might arise from the liquid tank device. Other tilt detection devices comprise an amount of mercury and means for detecting any displacement of the mercury along an axis or within a plane.

It is also possible to make use of electronic or electro-mechanical tilt sensors like e.g. a gyroscope, an accelerometer or a tilt sensor that allows to detect different tilt levels, i.e. a tilt angle that corresponds to a deviation of the alignment of the tank housing from an upright stand.

According to yet another aspect of the invention, the tilt information exceeding a preset tilt value is transmitted to a shut-off device that is operatively connected with at least one electrical component of the liquid tank device and that the shut-off device deactivates the electrical component after receipt of the tilt information. Thus, in case of a tilt of the tank housing that might result in critical operation conditions of the liquid tank device, the shut-off device can deactivate any electrical component of the liquid tank device like e.g. a pump or a heating element that is used during normal operation of the liquid tank device. Stopping any further heating of the liquid within the tank volume inside the tank housing reduces any risk of overheating a decreasing amount of liquid that remains inside the tank volume during or after leakage of liquid from the tilted tank housing. Furthermore, immediately stopping further operation of the heating element also prevents the heating element to overheat if there is not enough liquid to dissipate the amount of heat that is generated with the heating element, which reduces a risk of additional damage to the liquid tank device or any danger to a person that handles the tilted liquid tank device.

In order to provide a warning to any person that is close to the tilting liquid tank device, an optical or acoustical warning or a wireless signal is generated in case that the tilt information exceeds a preset tilt warning value. The tilt warning value can be identical to the tilt value that serves as threshold for closing off the conduit opening of the tank housing. However, it is also possible to define a different tilt warning value that results in a warning before the critical operation conditions occur which might help to avoid the critical operation conditions and the closure of the conduit opening as well as additional closure of openings or deactivation of electrical components of the liquid tank device. Furthermore, it is also possible to generate a warning information that can be wirelessly transmitted to a receiving device, e.g. to a mobile phone of a person or to a central monitoring unit that monitors the operation of such a liquid tank device. By including the possibility to generate a warning before an actual tilt or falling over of the liquid tank device, the method not only avoids a critical operating condition due to the tilting of the liquid tank device, but also warns and informs close persons that a critical operating condition may occur, which can then still be prevented.

The invention also relates to a liquid tank device with a tank housing for storing a liquid within a tank volume inside of the tank housing, whereby the tank housing comprises at least one conduit opening that can be connected in a liquid-tight manner to at least one conduit for the liquid such that the liquid can be supplied to or removed from the tank volume within the tank housing through the conduit opening. Such liquid tank devices are e.g. boilers that are located within an apartment or a building and that are used to provide for hot water. Usually, such liquid tank devices like boilers are intended for stationary use and are permanently connected to a liquid reservoir or a liquid supply like a water supply system of a building. Any damage of the liquid tank device that causes the leakage of liquid from the liquid tank device might then result in draining a large amount of liquid from the reservoir or from the liquid supply, causing the leakage of a large amount of liquid into the environments that is significantly larger than the amount of liquid that is stored within the tank housing of the liquid tank device.

Thus, there is a need for a liquid tank device that prevents the leakage of a large amount of liquid in case that there is an accidental leakage of liquid from the tank housing.

According to a very advantageous aspect of the invention, the liquid tank device comprises a tilt detection device that is fixedly positioned with respect to the tank housing for detecting a tilting of the tank housing, and in that the tilt detection device is operatively connected with a closing device with which the tank volume can be shut off from the at least one conduit in order to avoid further flow of liquid into or from the tank volume through the at least one conduit after detecting the tilting of the tank housing. Adding a tilt detection device and a closing device to the liquid tank device does not significantly increase the manufacturing costs or the operational costs of such a liquid tank device, but significantly increases the operational safety of such a liquid tank device by reducing the risk of leaking a large amount of liquid from the tank housing after the tank housing accidentally tilted or fell over.

The closing device can be a valve device that closes the conduit. It is also possible that the closing device comprises a closure that can be moved over the conduit opening in order to close the conduit opening in a liquid-tight manner. Such a closure can be a lid or a shutter that is relocated along a straight line or pivoted into a closing position that closes the conduit opening. The closure can be arranged outside the tank volume or inside the tank volume, i.e. at an outer side or inner side of the conduit opening in the tank housing. The valve or the closure can be actuated by a mechanical actuation device like e.g. a loaded spring or a electromagnetic actuation device that actuates the valve of the closure as soon as an electric power supply is disconnected from the mechanical actuation device. It is also possible to actuate the valve or the closure by an electrically operated actor, i.e. an electric motor.

According to yet another aspect of the invention, whereby the tank housing comprises at least one opening that is not connected with a conduit, a closing device is arranged at the tank housing that can be actuated to close the at least one opening in the tank housing that is not connected with a conduit. The closing device that can be used for closing an additional opening that is not connected to a conduit can be a separate closing device. Such another opening can be e.g. a relief valve or an outlet for the tank volume. The closing devices for the conduit opening and for the other opening can be identical or different, e.g. in dimensions or in operating method for closing the opening.

According to an embodiment of the invention, the closing device comprises a valve. The valve can be mounted in a section of the conduit adjacent to the conduit opening of the tank housing. It is also possible to mount the valve inside the tank volume in a manner that a valve body closes or opens the conduit opening according to the actuation of the closing device. In an open position, the valve body can be deflected by a spring device against a spring force, and can be moved in a closed position upon actuation of the closing device. The spring force can be preset in a manner as to provide a tight sealing of the closed conduit opening even though there might be a pressure applied against the valve body that is caused by the liquid supply from the conduit.

In case that the liquid supply that is provided by the conduit to the liquid tank device usually applies a significant external pressure, the valve body can be arranged outside the tank housing in a manner that by actuating the closing device the valve body is moved to the outside of the conduit opening that forms a valve seat. In the closed position the valve body then closes the conduit opening and any external pressure that is applied through the conduit further presses the valve body into the closed position and adds to the sealing of the closed conduit opening.

In yet another embodiment of the invention the tilt detection device comprises a mechanical leveling element and means for detecting a displacement of the mechanical leveling element. Such a mechanical leveling element can be a ball that is arranged within a forced guidance along one axis or on a two-dimensional surface. The mechanical leveling element can also be formed by an amount of mercury that forms a liquid drop within such a forced guidance. A displacement of a ball or a mercury drop that exceeds a preset distance can be detected and provide a tilt information. A forced guidance that comprises a two-dimensional surface allows for a reliable detection of a tilt in any direction that deviates from a vertical direction. Preferably, such a two-dimensional surface is a rotationally symmetric surface with a conical shape or a bowl-like shape. The steeper the outer parts of the surface, the larger a tilt of the tank housing must be before a ball or liquid drop reaches the outer circumference of the surface. Thus, the design of the surface allows for presetting a tilt value that initiates the closure of the conduit opening.

According to an advantageous aspect of the invention, the tilt detection device is capable of detecting at least two different tilting angles. The tilt detection device can be a tilt sensor e.g. a gyroscope or an accelerometer that generates a tilt signal that is proportional to a tilt angle that defines the deviation of the alignment of the tank housing from a vertical axis, i.e. from an upright stand. The liquid tank device may comprise an adjustment device that allows for a variable presetting of the tilt value. Thus, a small tilt value can be preset if the risk of leakage of liquid from the tank housing significantly increases with even small tilt angles, whereby a large tilt value can be preset if small tilt angles will not affect a safe operation of the liquid tank device, but the closing device should be actuated in case of a falling over of the tank housing. It is also possible to make use of a tilt detection device that detects at least one tilt angle and one normal angle.

In order to allow for additional information and preferably a timely warning to persons close to the liquid tank device, the liquid tank device comprises a warning device comprising means for emitting an optical or acoustical warning or a wirelessly transmitted warning information. Such means for emitting an optical warning may comprise a flash light or a display that shows a warning message. Means for emitting an acoustical warning may comprise a loudspeaker, a buzzer or a signal horn that emits a loud sound or noise that alerts persons that are near the liquid tank device. It is also possible to emit a signal that will be transmitted by wire or wireless to a receiver and may cause a warning at a distance to the liquid tank device. If e.g. the liquid tank device is part of a large plant, such a signal can be transmitted to a control center or a surveillance installation.

According to an advantageous aspect of the invention, the liquid tank device comprises a control unit for controlling the operation of the liquid tank device, whereby the tilt detection device is connected to the control unit in a tilt information transmitting manner. Thus, the control unit can be designed for and used for controlling one or more closing devices as well as for deactivating any electrical components like e.g. pumps or heating elements that are part of the liquid tank device and controlled by the control unit. It is also possible to add a separate shut-off device that is not controlled by the control unit, but can be used for a reliable deactivation of electronic components in case that an accidental tilt or falling over of the tank housing is detected.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

FIG. 1 schematically illustrates an exemplary embodiment of a liquid tank device 1 comprising a tank housing 2 and a tank volume 3 inside the tank housing 2 that is designed for and capable to store approx. 10 liters of a liquid 4, e.g. water. The tank housing 2 has a conduit opening 5 that is permanently connected to a conduit 6 which allows for a permanent supply of the liquid 4 from a liquid reservoir that is not shown in FIG. 1. The tank housing 2 also comprises an outlet 7 for dispensing the liquid 4 from the tank volume 3 inside the tank housing 2.

Figure 1:
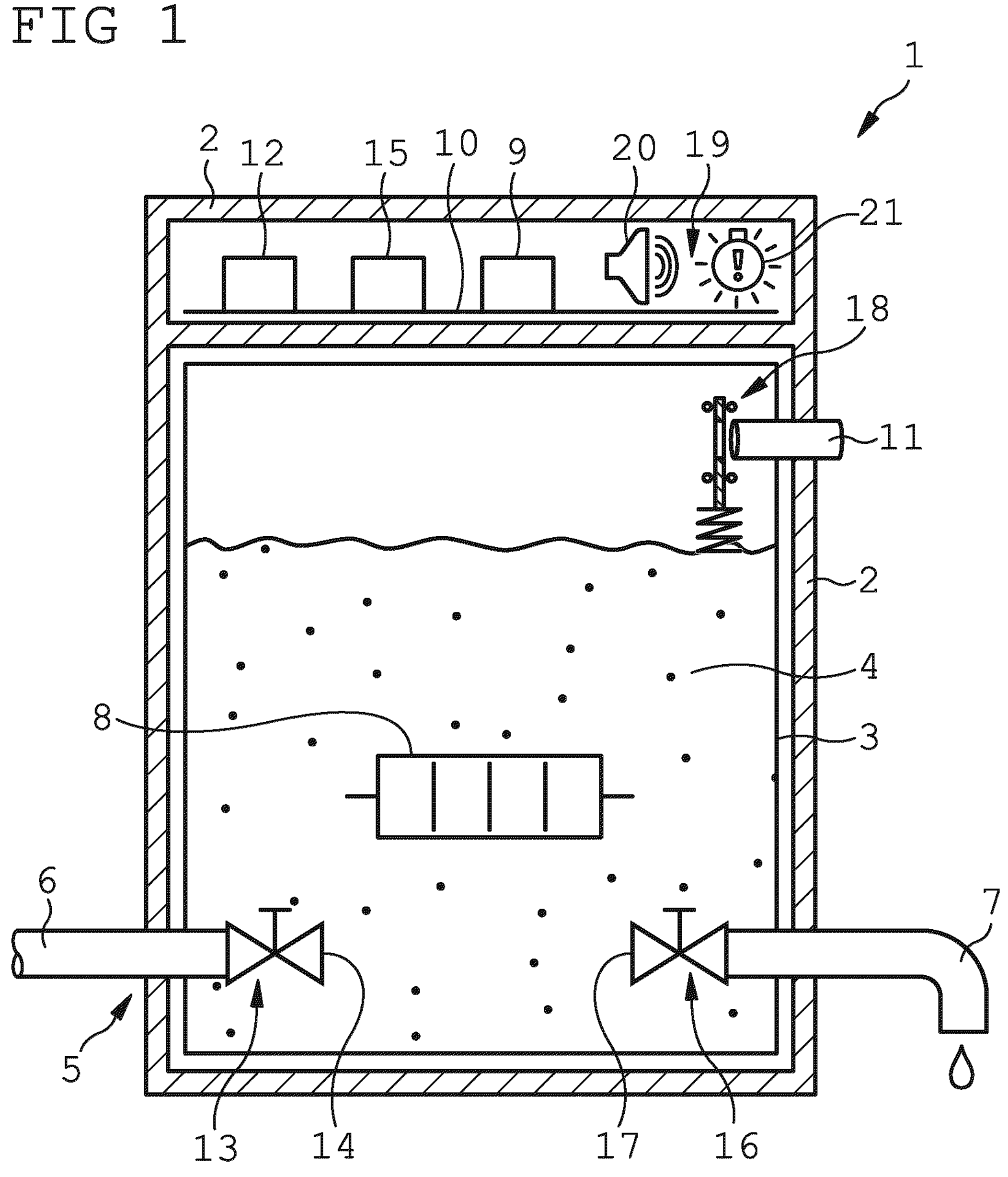
FIG. 1 illustrates a schematic representation of a liquid tank device that can be used as a boiler for providing hot water within a building.

A heating element 8 is mounted within the tank volume 3 and can be operated to heat the liquid 4 inside the tank volume 3. The heating element 8 is controlled by a control unit 9 that is arranged on top of a circuit board 10 which is fixedly mounted within the tank housing 2. The liquid tank device 1 also comprises a relief valve 11 that allows for removal of liquid 4 or steam in case of a pressure increase inside the tank volume 3 e.g. due to a heating of the liquid 4. Such a liquid tank device 1 can be used as a boiler to provide for hot water within a building, whereby the boiler is permanently connected to the water supply system of the building.

Figures 2, 3:
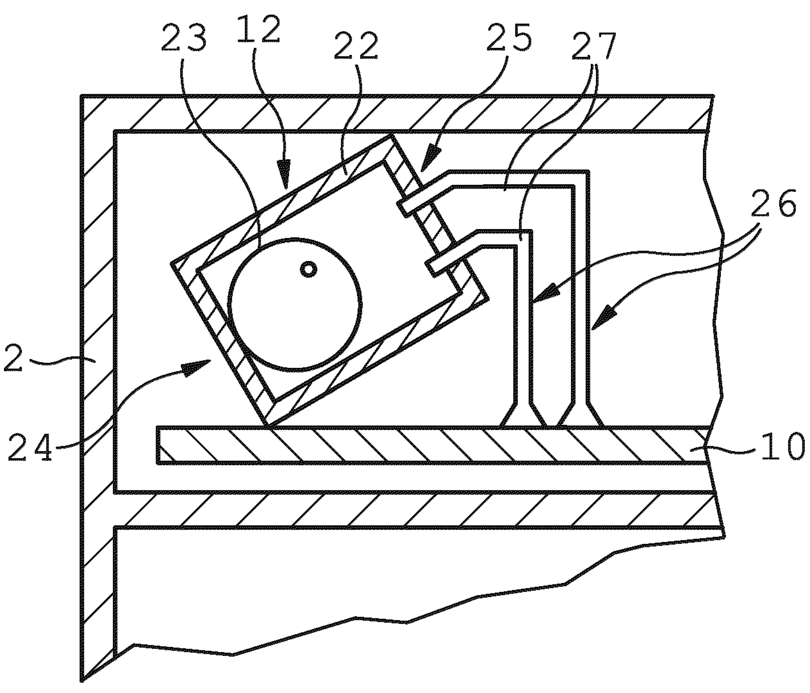
FIG. 2 illustrates a schematic representation of a tilt detection device that is fixedly positioned to a tank housing of the liquid tank device.
FIG. 3 illustrates a schematic representation of the various aspects and steps of a method for avoiding critical operating conditions of a liquid tank device shown in FIG. 1.

The liquid tank device 1 further comprises a tilt detection device 12 that is fixedly mounted with respect to the tank housing 2 and allows to detect a tilt of the tank housing 2. An exemplary embodiment of the tilt detection device 12 is schematically illustrated in FIG. 2. The tilt detection device 12 is operatively connected to a closing device 13 that comprises a valve 14 that can be operated to either open or close the conduit opening 5 of the tank housing 2 resulting in either connecting the tank volume 3 with a liquid reservoir via the conduit 6 or in shutting off the liquid tank device 1 from an external liquid supply. A tilt information that is generated by the tilt detection device 12 can be transmitted directly to the closing device 13 and can be used to initiate the closing of the valve 14. It is also possible to only transmitting the tilt information to the control unit 9 that then operates the closing device 13 and the valve 14. Furthermore, the tilt information can be forwarded to both, the closing device 13 and the control unit 9 which provides for a fallback option in case of a malfunction of the liquid tank device 1 that either interferes with the connection of the tilt detection device 12 with the closing device 13 or that interferes with the control unit 9. Thus, if a tilt of the tank housing 2 is detected by the tilt detection device 12, the conduit opening can be closed and further inflow of liquid into the tilted liquid tank device 1 can be stopped. In case of any unwanted leakage of liquid from the tilted liquid tank device 1, the maximum amount of liquid leakage is limited to the amount of liquid that is stored inside the tank volume 3, even though the tank volume 3 is permanently connected to a conduit 6 that provides for an additional liquid supply.

The tilt detection device 12 is also connected with a shut-off device 15 that is also arranged on top of the circuit board 10. The shut-off device 15 is operatively connected with an additional closing device 16 with a valve 17 that allows for closing off the outlet 7 and with a further closing device 18 with a sliding shutter that allows for shutting off the relief valve 11. As soon as a tilt information that indicates a large tilt of the tank housing 2 is transmitted to the shut-off device 15, the shut-off device operates the closing devices 16, 18 to shut off the outlet 7 and the relief valve 11. The shut-off device 15 further deactivates the heating element 8 within the tank volume 3 to avoid further heating of the liquid 4 and further increase of pressure inside the tank volume 3 due to ongoing heating of the liquid 4. Thus, the liquid tank device 1 is set to the safest possible operating mode resulting in a reduced risk of damages to the environment of the tilted liquid tank device 1.

Furthermore, the liquid tank device also comprises a warning device 19 with a loudspeaker 20 and a warning lamp 21. In case of a large tilt that might endanger a safe operation of the liquid tank device 1, the warning device 19 can emit e.g. warning sounds and warning light flashes in order to make persons aware of the imminent danger. The warning device 19 can also emit a wirelessly transmitted warning signal.

In FIG. 2 an exemplary embodiment of the tilt detection device 12 is schematically illustrated. The tank detection device 12 comprises a closed tube 22 with a ball 23 inside the tube 22. The ball is made of an electrically conducting material like e.g. metal. The tube 22 is fixedly mounted with respect to the tank housing 2 in a manner that a direction of a longitudinal axis of the tube 22 deviates from a horizontal axis forming a tilt angle between the horizontal axis and the longitudinal axis of the tube 22. The ball 23 remains at a first end 24 of the tube 22 until the tank housing 2 tilts and the direction of the longitudinal axis of the tube 22 changes such that a previously upper second end 25 of the tube 22 is positioned below the previously lower first end 24 of the tube 22, i.e. as soon as the tilting of the tank housing 2 exceeds the tilt angle that has been preset by the orientation of the tube 22 of the tank detection device 12. The second end 25 of the tube 22 is conductively connected with an open electric circuit 26 with two electrically conductive wires 27 that run into the tube 22 at a small distance towards each other. If the tube 22 is tilted and the ball 23 rolls from the first end 24 to the second end 25, the ball 23 contacts both wires 27 and closes the electric circuit 26, which generates a tilt information.

FIG. 3 schematically illustrates the operative connection between the tilt detection device 12 and the shut-off device 15, the closing devices 13, 16, 18 and the heating element 8. After detecting the tilting of the tank housing 2 with the tilt detection device 12, a tilt information is transmitted to the shut-off device 15 as well as directly to the closing device 13. Receiving the tilt information from the tilt detection device 12 activates the valve 14 of the closing device 13 and closes the conduit opening 5 of the tank housing 2. The shut-off device 15 that receives the tilt information from the tilt detection device 12 also triggers the closing device 13 and activates the other closing devices 16, 18. The shut-off device 15 further deactivates the heating element 8. In case that additional components like e.g. a pump are mounted inside the tank volume 3, the shut-off device 15 also stops any further operation of these additional components.

It is possible to make use of a tilt detection device 12 that allows for a precise detection of a tilt angle that is caused by a tilting movement of the tank housing 2 in any direction that deviates from a vertical alignment of the tank housing 2. Such a tilt detection device 12 may comprise a gyroscope or an accelerometer. It is also possible to make use of at least two tilt detection devices 12 that are designed to detect two different tilt angles.

Figure 4:
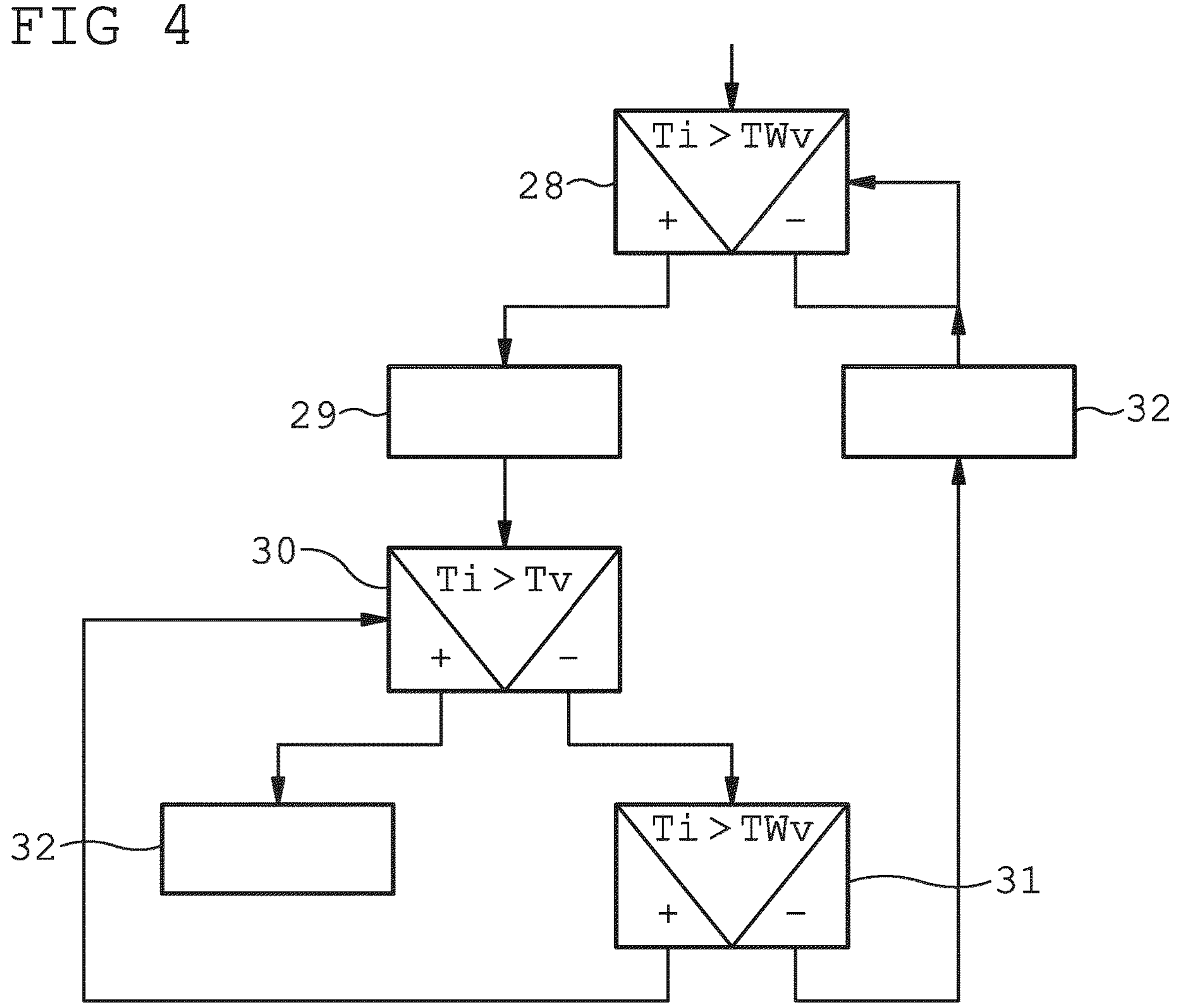
FIG. 4 illustrates a flow chart of the method comprising several steps during a tilt movement of the tank housing.

An exemplary embodiment of a method for warning of and avoiding critical operating conditions of the liquid tank device 1 is described with reference to the flowchart that is schematically illustrated in FIG. 4. A tilt value Tv is preset representing e.g. a tilt angle of 15 degrees deviation from a vertical alignment of the tank housing 2 of the liquid tank device 1. Furthermore, a tilt warning value TWv is preset representing e.g. a tilt angle of 7 degrees deviation from the vertical alignment of the tank housing 2, i.e. the tilt warning value is less than the tilt value.

During a normal tilt warning detection step 28 a tilt information Ti provided by the tilt detection device 12 is compared with the tilt warning value TWv. In case that the tilt information Ti is smaller than the tilt warning value TWv, the method continues with repeating the tilt detection step 28. However, in case that the tilt information Ti exceeds the tilt warning value TWv which indicates that the tank housing 2 is currently tilted more than the preset tilt warning angle, a warning activation step 29 is performed and the emission of a warning sound or a warning light is activated e.g. by the control unit 9 or by the shut-off device 15. Then a tilt detection step 30 is performed and the tilt information Ti is compared with the tilt value Tv. If the tilt information Ti is less than the tilt value Tv, the method continues with performing a critical tilt warning detection step 31, whereby the tilt information Ti is compared with the tilt warning value TWv. In case that the tilt information indicates a return of the tank housing 2 into the normal position with vertical alignment, the emission of warnings is stopped within a warning deactivation step 32 and the method returns to and continues with repeating the normal tilt warning detection step 28.

However, if during the tilt detection step 30 the tilt information Ti exceeds the tilt value Tv which indicates a tilting of the tank housing 2 that is dangerous for a continuing operation of the liquid tank device 1 and that might result in an unwanted leakage of liquid 4 from the liquid tank device 1, a safety mode entering step 32 is performed and the tilt information Ti is transmitted to the closing devices 13, 16, 18 and to the shut-off device 15 for closing of the tank volume 3 and for stopping normal operating procedures of the liquid tank device 1. The liquid tank device 1 is then set to the safest possible operating mode in order to limit any danger to the environment due to the accidental tilt of the tank housing 2. In addition, it is possible to change the warning sounds and warning light flashes that are emitted by the warning device 19 in order to signal the tilt of the tank housing 2, e.g. by altering the intensity of the warning signals or by altering the frequency of warning sounds or the duration of warning light flashes.

What is claimed is:

1. A method for avoiding critical operating conditions of a liquid tank device, wherein the liquid tank device comprises a tank housing for storing a liquid, consisting of water, within a tank volume inside of the tank housing, wherein the tank housing comprises at least one conduit opening that can be connected in a liquid-tight manner to at least one conduit for the liquid such that the liquid can be supplied to or removed from the tank volume within the tank housing through the conduit opening, comprising the steps of:

detecting a tilting of the tank housing with a tilt detection device; and shutting off the tank volume from the at least one conduit with a closing device when a tilt information from the tilt detection device exceeds a preset tilt value, resulting in avoiding further flow of liquid into or from the tank volume through the at least one conduit after detecting the tilting of the tank housing;

wherein the tank housing comprises at least one additional opening that is not connected with the at least one conduit, and further including the step of closing the at least one additional opening of the tank housing when the tilt information from the tilt detection device exceeds the preset tilt value.

2. The method according to claim 1, wherein the tilt detection device comprises a mechanical leveling element and that a displacement of the mechanical leveling element is detected that is caused by the tilting.

3. The method according to claim 1, wherein the tilt information exceeding a preset tilt value is transmitted to a shut-off device that is operatively connected with at least one electrical component of the liquid tank device and that the shut-off device activates the electrical component after receipt of the tilt information.

4. The method according to claim 1, wherein an optical or acoustical warning or a wireless signal is generated in case that the tilt information exceeds a preset tilt warning value.

5. A liquid tank device, comprising: a tank housing for storing a liquid, consisting of water, within a tank volume inside of the tank housing, wherein the tank housing comprises at least one conduit opening that can be connected in a liquid-tight manner to at least one conduit for the liquid such that the liquid can be supplied to or removed from the tank volume within the tank housing through the conduit opening, wherein the liquid tank device comprises a tilt detection device that is fixedly positioned with respect to the tank housing for detecting a tilting of the tank housing, and wherein the tilt detection device is operatively connected with a closing device with which the tank volume is shut off from the at least one conduit in order to avoid further flow of liquid into or from the tank volume through the at least one conduit after detecting the tilting of the tank housing;

wherein the tank housing comprises at least one additional opening that is not connected with the at least one conduit, wherein a second closing device is arranged at the tank housing that is actuated to close the at least one additional opening in the tank housing that is not connected with the at least one conduit after detecting tilting of the tank housing.

6. The liquid tank device according to claim 5, wherein the closing device comprises a valve.

7. The liquid tank device according to claim 5, wherein the tilt detection device comprises a mechanical leveling element and means for detecting a displacement of the mechanical leveling element.

8. The liquid tank device according to claim 5, wherein the tilt detection device is capable of detecting at least two different tilting angles.

9. The liquid tank device according to claim 6, wherein the liquid tank device comprises a control unit for controlling the operation of the liquid tank device, wherein the tilt detection device is connected to the control unit in a signal-transmitting manner.

10. The liquid tank device according to claim 5, wherein the liquid tank device comprises a warning device comprising means for emitting an optical or acoustical warning or means for emitting a wirelessly transmitted warning signal.

11. The method according to claim 1, wherein the liquid tank device further includes a relief valve that allows for removal of liquid or steam in case of a pressure increase inside the tank volume and a closing device capable of shutting off the relief valve, and further including the step of shutting off the relief valve using the closing device if the tilt information from the tilt detection device exceeds the preset tilt value.

12. The liquid tank device according to claim 5, wherein the liquid tank device further includes a relief valve that allows for removal of liquid or steam in case of a pressure increase inside the tank volume and a closing device capable of shutting off the relief valve, wherein the closing device shuts off the relief valve when the tilt detection device detects tilting of the tank housing.

13. The method according to claim 1, wherein the liquid tank device further includes a shut-off device and a heating element located within the tank housing operatively connected to the shut-off device, and further including the step of using the shut-off device to deactivate the heating element to avoid further heating of the liquid when the tilt information from the tilt detection device exceeds the preset tilt value.

14. The liquid tank device according to claim 5, wherein the liquid tank device further includes a shut-off device and a heating element located within the tank housing operatively connected to the shut-off device, and wherein the shut-off device is capable of deactivating the heating element to avoid further heating of the liquid when the tilt information from the tilt detection device exceeds the preset tilt value.

* * * * *